United States Patent
Bump et al.

(10) Patent No.: US 8,527,888 B2
(45) Date of Patent: Sep. 3, 2013

(54) METHOD AND SUPPORTING CONFIGURATION USER INTERFACES FOR STREAMLINING INSTALLING REPLACEMENT FIELD DEVICES

(75) Inventors: Scott S. Bump, Franklin, MA (US); Nestor J. Camino, Jr., Ilingham, MA (US); Vladimir Kostadinov, Sharon, MA (US); Charles W. Piper, Foxboro, MA (US); Richard L. Linscott, Plainville, MA (US); Johan I. Tegnell, Mansfield, MA (US)

(73) Assignee: Invensys Systems, Inc., Foxboro, MA (US)

( * ) Notice: Subject to any disclaimer, the term of this patent is extended or adjusted under 35 U.S.C. 154(b) by 1646 days.

(21) Appl. No.: 11/403,224

(22) Filed: Apr. 11, 2006

(65) Prior Publication Data

US 2007/0250180 A1    Oct. 25, 2007

(51) Int. Cl.
    *G06F 3/00*    (2006.01)
    *G05B 15/00*   (2006.01)

(52) U.S. Cl.
    USPC ................................. 715/748; 700/1

(58) Field of Classification Search
    USPC ............................. 715/762; 700/1
    See application file for complete search history.

(56) References Cited

U.S. PATENT DOCUMENTS

| | | | |
|---|---|---|---|
| 5,796,602 A * | 8/1998 | Wellan et al. | 700/1 |
| 5,903,455 A * | 5/1999 | Sharpe et al. | 700/83 |
| 5,909,368 A * | 6/1999 | Nixon et al. | 700/2 |
| 5,980,078 A * | 11/1999 | Krivoshein et al. | 700/1 |
| 6,446,202 B1 * | 9/2002 | Krivoshein et al. | 713/1 |
| 6,449,715 B1 | 9/2002 | Krivoshein | |
| 6,490,493 B1 * | 12/2002 | Dharnipragada | 700/97 |
| 6,618,630 B1 * | 9/2003 | Jundt et al. | 700/17 |
| 6,754,885 B1 | 6/2004 | Dardinski et al. | |
| 7,020,532 B2 | 3/2006 | Johnson et al. | |
| 2002/0095515 A1 * | 7/2002 | Christensen et al. | 709/245 |
| 2002/0123864 A1 * | 9/2002 | Eryurek et al. | 702/188 |
| 2002/0184410 A1 * | 12/2002 | Apel et al. | 710/5 |
| 2004/0254648 A1 * | 12/2004 | Johnson et al. | 700/1 |
| 2004/0259533 A1 * | 12/2004 | Nixon et al. | 455/414.1 |
| 2004/0260405 A1 * | 12/2004 | Eddie et al. | 700/3 |
| 2005/0102585 A1 * | 5/2005 | Hodson | 714/48 |

OTHER PUBLICATIONS

International Search Report for PCT/US07/66244 dated Oct. 24, 2007.
Written Opinion for PCT/US07/66244 dated Oct. 24, 2007.

* cited by examiner

*Primary Examiner* — Stephen Alvesteffer
(74) *Attorney, Agent, or Firm* — Edward S. Jarmolowicz

(57) ABSTRACT

A method and user interfaces are described herein installing a field device as a replacement for a previously installed field device of a same type in a process control system. The disclosed method includes initially specifying a device type commissioning definition that includes a set of device-type specific parameters. A first set of instance-specific configuration parameter values are then stored for a first field device. When replacing the first field device by a second field device of the same type on a process control network, the commissioning definition and the previously stored parameters for the first device are used to automatically configure the second device.

17 Claims, 7 Drawing Sheets

METHOD AND SUPPORTING CONFIGURATION USER INTERFACES FOR STREAMLINING INSTALLING REPLACEMENT FIELD DEVICES

CROSS-REFERENCE TO TWO RELATED APPLICATIONS

This application relates to Bump et al., U.S. patent application Ser. No. 11/403,228, filed on Apr. 11, 2006, entitled "UTILITY FOR COMPARING DEPLOYED AND ARCHIVED PARAMETER VALUE SETS WITHIN A FIELD DEVICE EDITOR" the contents of which are expressly incorporated herein by reference in their entirety, including any references therein.

This application relates to Bump et al., U.S. patent application Ser. No. 11/403,226, filed on Apr. 11, 2006, entitled "TOOL FOR CREATING CUSTOMIZED USER INTERFACE DEFINITIONS FOR A GENERIC UTILITY SUPPORTING ON-DEMAND CREATION OF FIELD DEVICE EDITOR GRAPHICAL USER INTERFACES," the contents of which are expressly incorporated herein by reference in their entirety, including any references therein.

FIELD OF THE INVENTION

This invention relates generally to networked computerized industrial process control systems and, more particularly, relates to maintenance/replacement of intelligent field devices (e.g., transmitters, positioners, etc.) within such process control systems.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms and are used by industrial process control systems to regulate a variety of operations, both with respect to continuous and discrete manufacturing processes. By way of example the measurements produced by a sensor/recorder include: a temperature, a pressure, a pH, a mass/volume flow of material, a quantity of bottles filled in an hour, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as adjust a valve position, or even move equipment into and out of service as required.

Typical industrial processes today are extremely complex and comprise many intelligent transmitters and/or positioners. By way of example, it is not unheard of to have thousands of sensors and control elements (e.g., valve actuators) monitoring/controlling aspects of a multi-stage process within an industrial plant. These sensors and control elements are subject to wearing out and/or failing over time. In such instances, a replacement field device, often of same model and version, is installed in place of the failing/worn field device. As field devices have become more advanced over time, the process of setting up field devices for use in particular installations has also increased in complexity.

In previous generations of industrial process control equipment, and more particularly field devices, transmitters and positioners were comparatively simple components. Before the introduction of digital (intelligent) transmitters, setup activities associated with replacing a worn out/failing field device with a new one were relatively simple. Industry standards like 3-15 psi for pneumatic instruments or 4-20 ma for electronic instruments allowed a degree of interoperability that minimized setup and configuration of analog transmitters.

More contemporary field devices that include digital data transmitting capabilities and on-device digital processors, referred to generally as "intelligent" field devices, require significantly more configuration effort when setting up a new field device to replace a previously existing field device—to match the application within which the existing device is used. During configuration a set of parameters are set, within the new/replacement device, at either a device level (HART, PROFIBUS, FoxCOM, DeviceNet) or a block level within the device (FOUNDATION™ fieldbus).

Replacing complex, intelligent devices requires the person performing the replacement activity to possess considerable knowledge of the specific device that is being replaced. Furthermore, during replacement a previously (bench) calibrated replacement field device is potentially disabled. The disabled replacement field device must be re-calibrated—which may require highly-specialized equipment and well trained technicians. In view of the significant consequences associated with disabling a field device during installation, users are generally informed regarding the following: parameters that must not be changed during device configuration; and parameters that configuration tools (software) adjust in response to particular configuration actions taken by the user.

In addition to the significant risks to configuration settings mentioned herein above arising from parameter editing by users, users must have knowledge of which operational modes allow configuration activities to be performed on certain types of devices. There are no general or obvious rules that are intuitive to learn and remember. In view of the complexities associated with configuring the large number of parameters associated with field devices, applications have been provided that present a subset of configurable parameters. However, the user is still required to enter/confirm values for the new/replacement field device. Such applications do not preclude potential configuration errors associated with specifying values for the configurable parameters. As a consequence, the mere replacement of an existing field device with a field device having a same set of configurable parameters (e.g., a device of the same model and version/revision) is still an operation requiring a relatively high degree of skill and knowledge by the person performing the replacement. Such device-specific knowledge includes, but is not limited to, identifying a set of parameters that must be configured as well as parameters (e.g., calibration values) that must not be modified during configuration/installation. In addition, the installer must potentially know specific methods/operations that need to be executed before a replacement device is fully operational in a particular application environment.

SUMMARY OF THE INVENTION

In view of the challenges and complexities of configuring intelligent field devices, including transmitters and positioners, a method for replacing a previously configured device having corresponding parameters is described herein. In accordance with the present invention, a method is presented wherein a set of parameters that require configuration during replacement of a particular type of field device are specified. An application engineer/technician specifies, for a first instance of the particular type of field device, appropriate values for the set of parameters. The values for the set of parameters are stored within a repository of device instance configuration information within a process control network.

In accordance with embodiments of the present inventive method, a maintenance technician replaces the first instance of the field device with a second instance of the particular field device type on the process control network. The technician, during replacement of the first instance by the second instance of the field device, invokes an automated device replacement operation, for downloading to the second field device instance the values for the set of parameters previously specified for the first instance and stored in the repository of device instance configuration information. The technician invokes the operation through a simple user interface action such as, for example, selecting a Commissioning Operation.

Thus, process control network/system maintenance engineers and technicians, who are generally assigned the task of performing final device setup or replacement in the field, are provided a tool for accelerating and simplifying the process of replacing a field device instance with another one of the same type (i.e., utilizing a same set of configurable/programmable parameters). The above-described method and components facilitate streamlined device replacement by technicians having limited knowledge of configurable parameter values associated with replaced devices. Furthermore, human error possibilities are significantly reduced in regard to setting configurable parameters on the replacement field devices.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

In summary of exemplary embodiments of the present invention described herein, replacing previously installed/ configured field device instances with field device instances of a same type is facilitated by a field device maintenance application, comprising a set of components. The set of components includes, by way of example, a user interface supporting invoking a device replacement operation; a user interface supporting user configuration of device type-specific replacement steps; a device description (DD) interpreter that facilitates presenting details associated with a particular device configuration; an automated field device replacement function that executes a device replacement script for a particular field device; a communications interface supporting transmitting configuration values to specified replacement field devices; a replacement progress monitor to verify successful completion of each step of the replacement process; and a user interface that displays the status of the replacement process and allows users to control the replacement process. In contrast to the known methods for replacing previously existing field devices, the above-described set of components facilitate installing a replacement field device by merely identifying an instance-specific identification of the replaced field device having configuration information previously stored in a configuration archive to which an automated replacement field device application has access.

Figure 1:
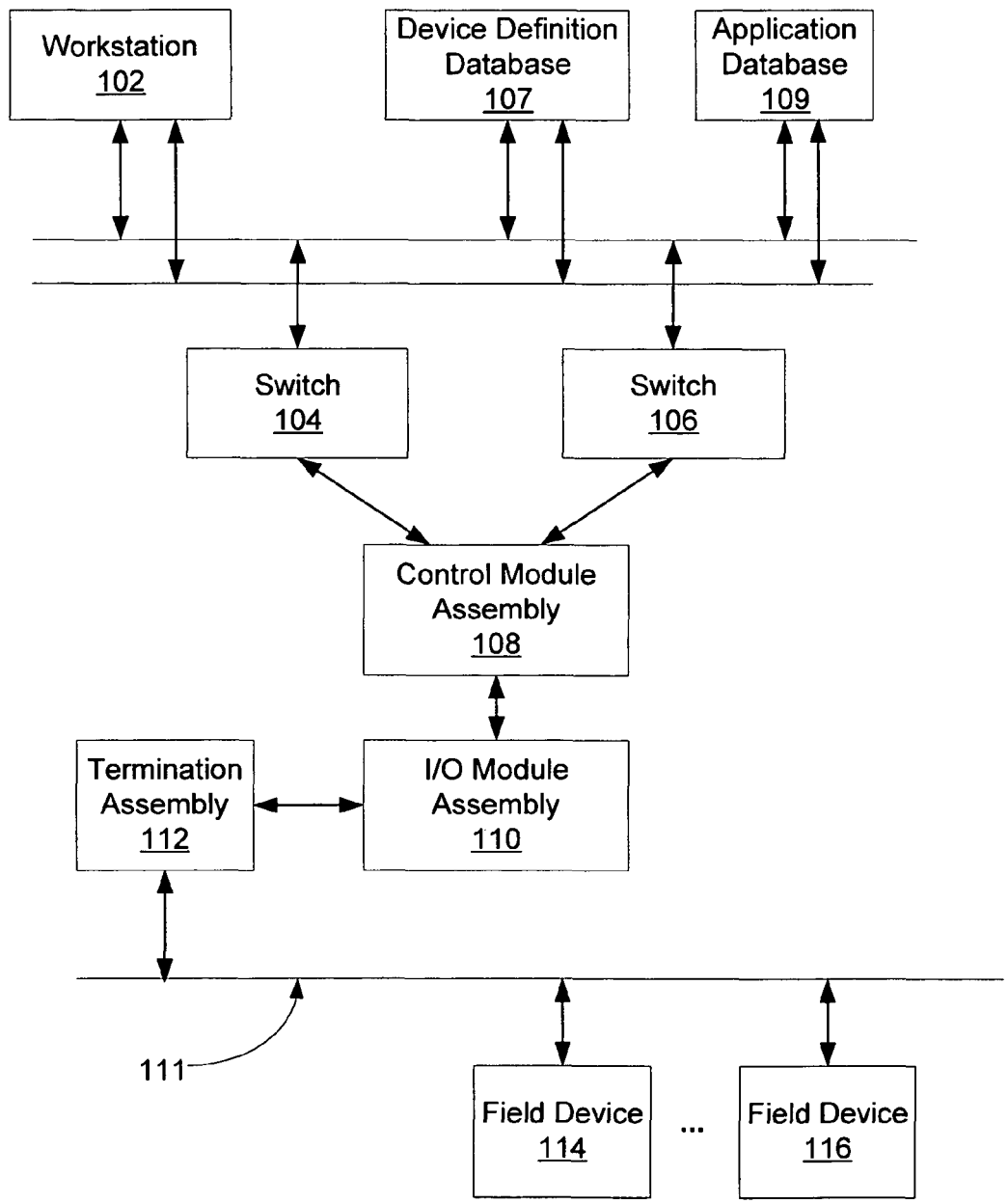
FIG. 1 is schematic diagram depicting an exemplary process control network environment wherein the present invention is potentially incorporated.

Turning to FIG. 1, an exemplary simple industrial process control system arrangement/environment is depicted. A workstation 102, comprising a variety of field device configuration and monitoring applications, provides an operator/engineering interface through which an engineer/technician monitors the components of an industrial process control system. The workstation 102 comprises any of a variety of hardware/operating system platforms. By way of example, the workstation 102 comprises a personal computer running any of a variety of operating systems such as: Microsoft Windows, UNIX, Linux, Solaris, Mac OS-X, etc.

In the illustrative example, the workstation 102, device definition database 107 and application database 109 are connected in a redundant configuration via dual Ethernet interfaces/wiring to redundant switches 104 and 106. The Ethernet switches 104 and 106 are commercially available and provided, for example, by Allied Telesyn (e.g., model AT-8088/MT). While not specifically depicted in FIG. 1, additional nodes, comprising workstations, servers and other elements (e.g., control module assemblies) of a supervisory portion of the process control system are potentially connected to the redundant switches 104 and 106. In the illustrated embodiment, a device definition database 107 and application database 109 store information regarding device types (templates) and device instances, respectively. Furthermore, while hard-wired connections between the workstation and switches 104 and 106 via ETHERNET local area network links are depicted in FIG. 1, such links over a local supervisory level process control network are alternatively carried out via wireless network interfaces.

The switches 104 and 106 (as well as potentially other non-depicted switches) are also communicatively coupled to a control module assembly 108. The control module assembly 108 comprises one or more control modules (also referred to as control processors). An illustrative example of such control module is a Foxboro CP model FCP270, by Invensys Systems, Inc. In other embodiments, process control functionality is carries out in any of a variety of control modules— even by control programs incorporated into the workstations, intelligent transmitters, or virtually any communicatively coupled device capable of executing control programs, loops, scripts, etc.

With continued reference to FIG. 1, an I/O module assembly 110, alternatively referred to as a field bus module, is connected to the control module assembly 108. The communications protocols utilized for carrying out communications between the I/O module assembly 110 and control module assembly 108 is potentially any one of a variety of proprietary/non-proprietary communications protocols. In one embodiment, the communications between the control module assembly 108 and I/O module assembly 110 are carried out via a 2 MBit HDLC communication bus. While only a single I/O module assembly 110 is depicted in the illustrative example, embodiments of the invention comprise many I/O module assemblies.

The I/O module assemblies, in general, include a variety of interfaces for communicating directly and/or indirectly to a variety of devices including, for example, field devices. In the illustrative example, the I/O module assembly 110 comprises a Foundation Fieldbus I/O module (e.g., an Invensys field bus module model FBM228) that supports communications between the control module assembly 108 and a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of an industrial process control system to measure (transmitters) and control (positioners) plant activity. A Termination Assembly 112 communicatively couples the I/O module assembly 110 to the field devices 114 and 116. The termination assembly 112 provides power and power conditioning to the extent needed by the field devices 114 and 116 on the network 111.

The configuration of the Device Commissioning, and the commissioning step itself, is executed from the workstation 102.

The process control network schematically depicted in FIG. 1 is greatly simplified for purposes of illustration. Those skilled in the art will readily appreciate that both the number of components, at each depicted level of the exemplary process control system, is generally many times greater than the number of depicted components. This is especially the case with regard to the number of depicted field devices. In an actual process control environment, the number of field devices, comprising both input devices (e.g., transmitters) and output devices (e.g., positioners) number in the hundreds for an industrial process control system. Incorporation of a field device configuration infrastructure/toolset that supports archiving configurable parameter value sets for each field device presently within a process control system, and thereafter downloading such parameter values into replacement field devices (of the same type and therefore having the same configurable parameter value sets as field devices that are to be replaced) at the time of replacement, facilitates streamlining the field device replacement task. Such infrastructure and replacement method are described further herein below.

Figures 2, 3:
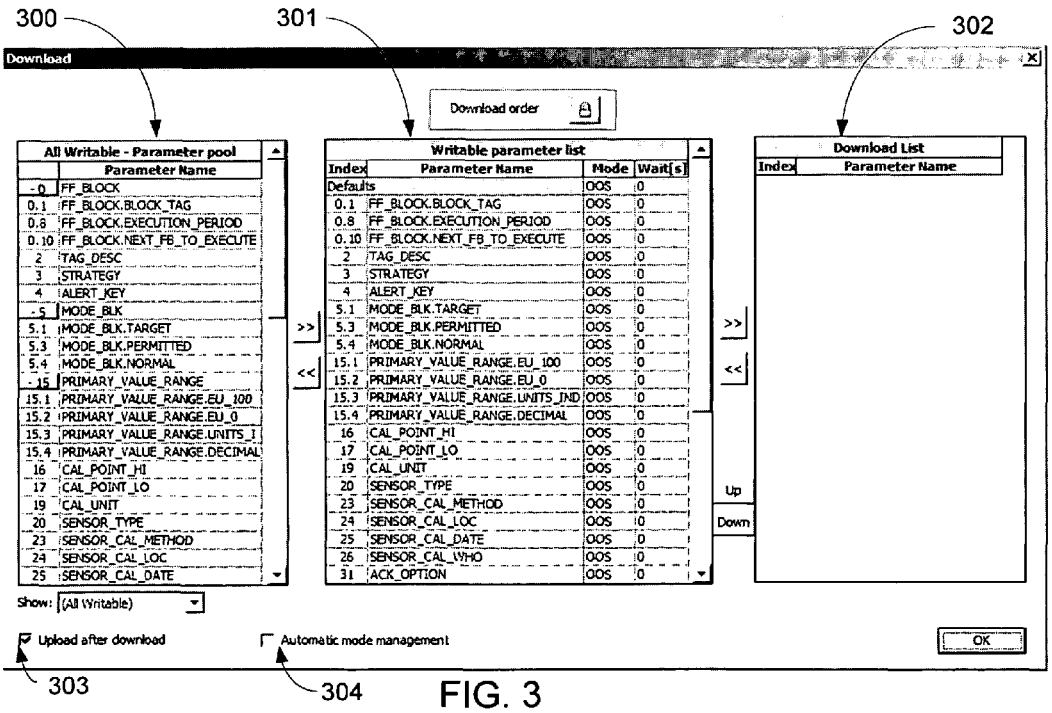
FIG. 2 is an exemplary user interface that displays a set of parameters associated with a particular type of field device.
FIG. 3 is an exemplary user interface for configuring/customizing a Device Commissioning operation to include a subset of the set of parameters depicted in FIG. 2.

Turning to FIG. 2, an illustrative parameter display interface is provided that depicts a partial set of parameters associated with an instance of an intelligent field device. The parameters potentially exist at both the device level and within block structures associated with the particular intelligent field device instances. The parameters are generally defined by a data type and a value corresponding to the data type.

Furthermore, parameter instances potentially are associated with a status or data quality indication.

The device parameters could be any of a number of parameters including parameters for:
Operational mode (AUTO, OOS, etc)
Engineering units
Scaling parameters
Filtering parameters
Limit settings Turning to FIG. 3, an aspect of an illustrative embodiment of the replacement method described herein comprises a replacement set-up phase. This portion of the setup-phase defines the Device Commissioning operation for all device instances of a common device type. During the set-up phase, a parameters portion 300 of the user interface presents a set of configurable parameters. The user designates, by selecting parameters from the parameters list, parameters which can be modified during device configuration and moving them to a writeable parameters portion 301 of the user interface. From the writeable parameters portion 301, the user selects parameters for automatic value specification from an archival copy during a Device Commissioning operation by setting them in a download list portion 302 of the user interface. "Device commissioning" refers to a user invoking automatic setup, including filling of pre-designated parameter values, of a replacement field device by selecting a single operation. In the illustrative embodiment, the parameters in the download list portion 302 of the user interface correspond to the parameter for which a value will automatically be downloaded to the replacement field device. In general, the parameters selected for Device Commissioning represent parameter values that must be properly configured before a field device is fully operational.

In an embodiment of the invention, after a user designates one or more field device configuration parameters (via the interface depicted in FIG. 3) for incorporation into a Device Commissioning operation, values are specified for each of the designated Device Commissioning parameters. In an embodiment of the invention, a user interface, such as the one depicted in FIG. 2, supports entry of values for the parameters in association with configuration of an original/first field device. Alternatively, in the event that the first field device was previously configured (and thus values have been specified for the selected parameters), the relevant parameter values are extracted from the first field device or any other suitable storage location containing the first device's designated parameter values. Regardless of how the parameter values are obtained, the Device Commissioning parameters and their associated values in the first field device are thereafter stored in a configuration file/database accessible to a Device Commissioning configuration application described further herein below. FIG. 3 depicts an exemplary set of parameters for which a set of values are stored to facilitate Device Commissioning/automatic downloading/replacement when the original/first field device instance is replaced by a second instance of a field device of the same type (supports a same set of parameters as those specified for Device Commissioning). Thus, the user need only fill in the appropriate values for each parameter for the instance of the device.

In the exemplary embodiment, devices may contain parameters which are not part of normal device configuration. An exemplary set of such parameters are calibration parameters set in the device as part of calibration operations. For archival purposes these parameters must be read from the device as an upload step during Device Commissioning. In FIG. 3, the user specifies that device parameters will be read as part of Device Commissioning by selecting an upload parameters checkbox 303.

In the exemplary embodiment, writing parameters to the device requires the device to be placed into the proper operational mode. The user can select an automatic mode management option 304 to allow the Device Commissioning operation to automatically manage the device operational mode.

During Device Commissioning, devices and their blocks are required to be in specific modes to allow parameter configuration. The objective of this feature is to minimize user interactions and the associated risk of human error.

It is emphasized that FIG. 3 illustrates one type of interface that could be used to select the set of parameters that are automatically downloaded to a replacement device during Device Commissioning. However, there are many other user interfaces that can potentially fulfill this part of the method.

With regard to the scope of operations performed by Device Commissioning functionality described herein, the operations performed by the Commissioning function are not limited to loading previously archived parameter values onto a replacement field device. Rather, the replacement functionality comprises all aspects of configuring and bringing a replacement for a previously configured field device on-line.

Having described exemplary user interfaces for configuring/customizing Device Commissioning for a field device that is potentially applied to a particular field device instance, field device type or a class of field device types, attention is directed to steps carried out to configure a Device Commissioning operation for a first field device instance. Thereafter, a set of exemplary steps are described for carrying out field device replacement utilizing the previously specified Device Commissioning configuration.

Figure 4:
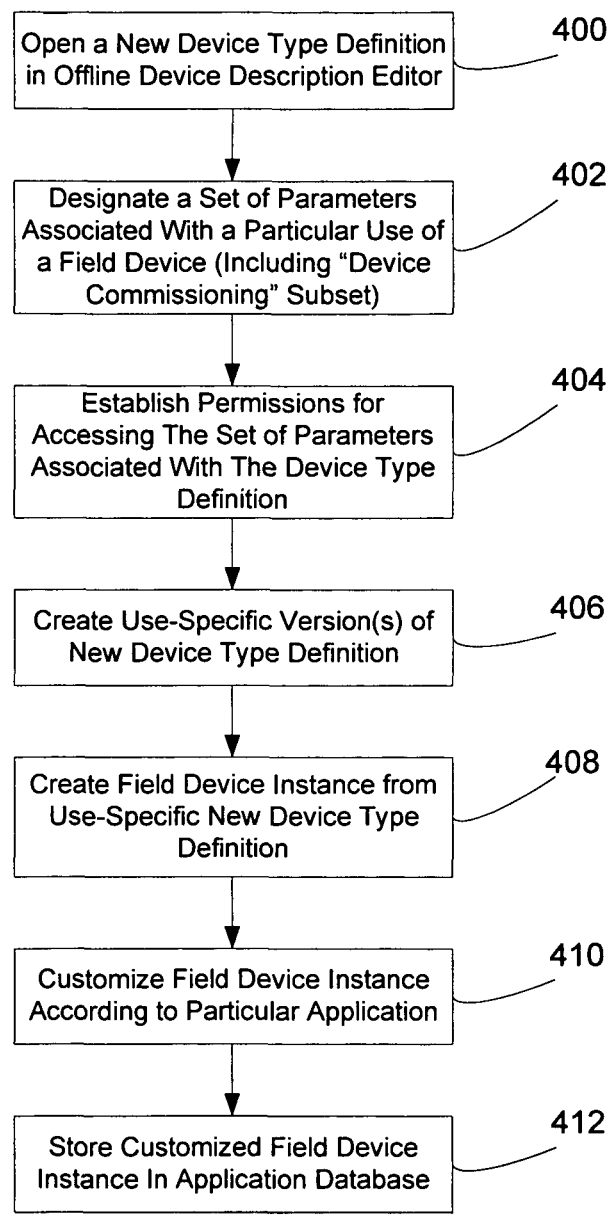
FIG. 4 is a flowchart summarizing a set of steps for creating a Device Commissioning configuration definition for a particular field device instance in a process control network.

Turning to FIG. 4, a flowchart depicts a set of steps performed for defining a field device replacement object template (stored in the device definition database 107) and creating a field device replacement object instance (stored in the application database 109), from the object template, corresponding to a specific field device installed on a process control network. While referred to herein as a "replacement" object, the replacement object potentially contains additional fields for describing a particular field device that facilitate a variety of additional functions associated with a specified field device instance. The field device replacement object stored in the application database 109, among other things, facilitates streamlining the task of replacing a first field device, corresponding to a field device replacement object instance, by a second field device of the same type. In an illustrative embodiment, the setup steps are performed offline, before the original/first instance of a particular field device is rendered operational. In general, the setup steps are divided into two stages: (1) device type/application setup and (2) device instance setup.

During device type/application setup, a user, using a device definition tool (configurator), defines device objects for field devices of a particular type and application and stores the device object definitions within the device definition database 107 that is accessed by configuration components/editors. In particular, at step 400, a user opens a new device type definition in a device definition tool editor. By way of example, a user selects a new FIELDBUS FOUNDATION Device Description for a FIELDBUS FOUNDATION field device to add to the set of device types maintained in the device definition database accessible to a set of users seeking to configure field devices on a process control system depicted, by way of example, in FIG. 1.

During step 402 the user proceeds to designate a set of parameters generally associated with the new device type definition (including a particular use of a field device) opened during step 400. A user designates, via the device definition tool editor, one or more groups of parameters associated with a particular use of a particular field device (e.g., a pressure transmitter used to measure fluid level in a cylindrical tank). One group (or subset) of the designated set of parameters (see, e.g., FIG. 3) comprises a Device Commissioning parameter set. The Device Commissioning parameter set specifies parameters for which values from a first field device will be loaded into a second field device during execution of a Device Commissioning field device replacement operation described further herein below.

At step 404 a user having administrator rights, after designating the set of parameters during step 402, defines access privileges for all potential users that will seek access, through a field device configuration component/editor or any other applicable tool, to the new device type definition and the designated parameters contained therein. The privileges ensure that only those with proper knowledge/rights are allowed to change the set of parameters associated with the device type definition.

After establishing permissions for the new device type, at step 406 a user defines potentially multiple copies/versions of the new device type defined during step 402. Each version of the new device type is assigned a unique identification. The versions facilitate specifying/defining new use-specific device types under the more general new device type. The versions of a new device type share a common set of designated parameters. However, the initial values assigned to the versions differ based upon the particular use of the field device corresponding to the new device type definition. By way of example, a generally defined "differential pressure transmitter" device type is more specifically defined during step 406 for two distinct uses such as: (1) measuring fluid flow rate in a pipe and (2) measuring the level of a fluid in tank. The versions of the differential pressure transmitter used to measure fluid level in a tank can be further distinguished based upon the shape/orientation of the tank.

Each use-specific version of the more generally defined device type (specified during step 402) is stored under a uniquely identified field device type definition to reflect differences between a set of initial values associated with the parameter sets for distinct uses of the identified field device. The versions of the device type definition are stored in the device definition database 107. The device type definitions, stored in the form of device object templates, provide a structure for creating actual field device objects corresponding to actual field devices in a process control system.

During the field device instance setup stage, carried out after initially defining the new device type and versions thereof, a user creates a device object instance from the device type definition version (device template) previously stored during step 406 in the device definition database 107. In particular at step 408 a user, through a configuration component tool used to configure elements (e.g., field devices) of a process control system, creates a field device instance from the previously stored device type definition stored in the device definition database. The field device instance is stored by the configuration component tool in the application database 109 comprising a set of application objects (including field device object instances) corresponding to components that make up a process control system application.

At step 410, the configuration component tool is utilized to configure the field device instance created during step 408 for a particular application. During step 410, the use-specific field device object is customized for a particular application (actual installed field device) of a process control system. The customized field device object is thereafter stored in the application database during step 412. At this point an instance of a field device object has been created and customized for a particular field device and contains all of the configuration information needed to define a field device. The configuration information contains the information that facilitates a user subsequently completing a Device Commissioning field device installation as well as replacement of a previously installed field device. Such tasks are described further herein below.

Replacing a previously installed (first instance) field device with another (second instance) field device of the same type using streamlined "Device Commissioning" configuration techniques is potentially carried out in any of a variety of ways. Two such methods include: (1) pre-configuring a replacement field device in an instrument shop by performing "Device Commissioning" and then physically installing the replacement field device in a factory/plant floor environment to complete the configuration procedure (see FIG. 5), and (2) installing a non-configured replacement field device in the plant followed by performing "Device Commissioning" via a control system console user interface (see FIG. 7). Both the first method and second method, identified above, incorporate "Device Commissioning" techniques that streamline replacing the first instance by the second instance using configuration information/settings stored in the application database 109 corresponding to the first instance of the field device.

Figure 5:
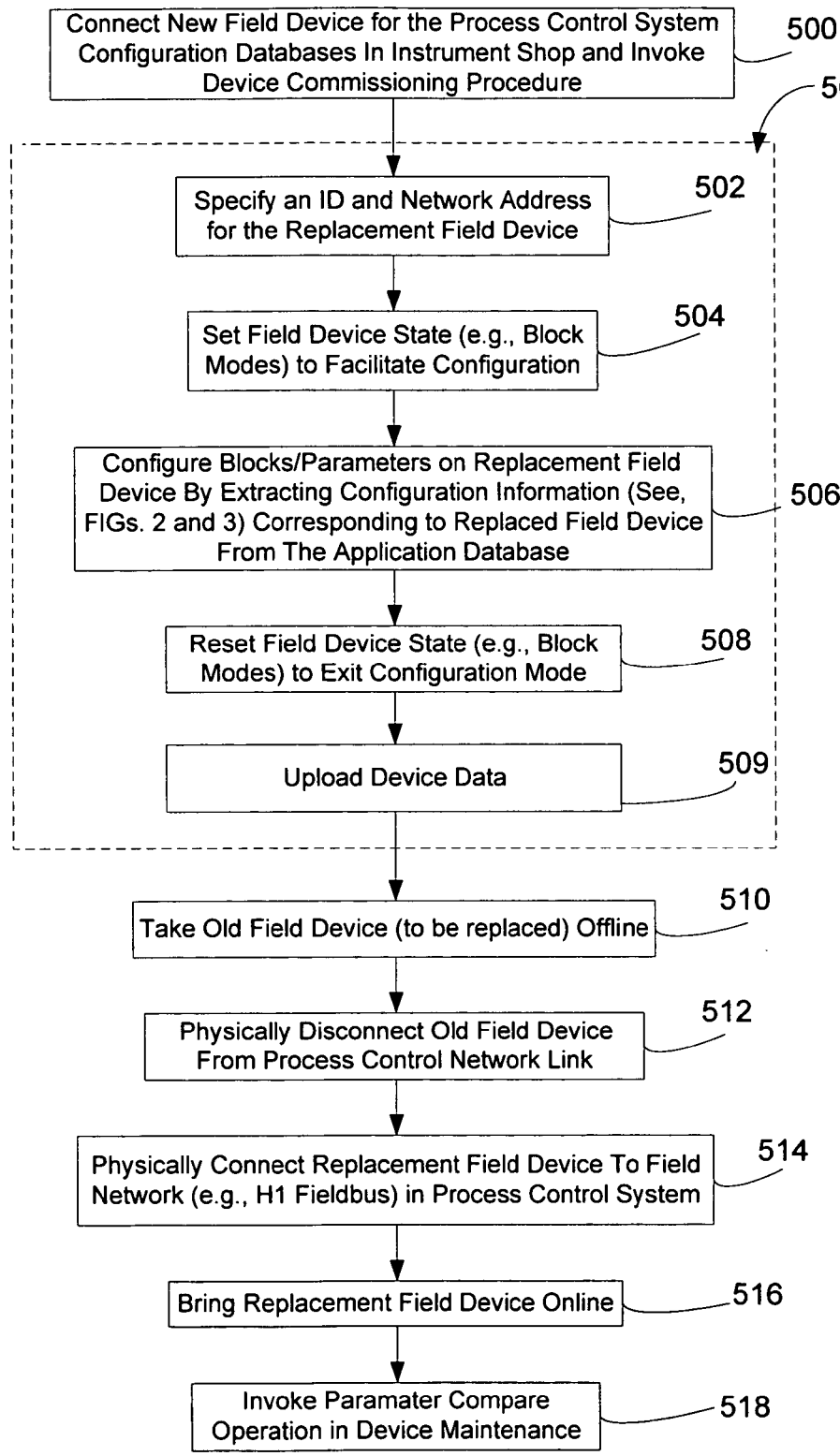
FIG. 5 is a flowchart summarizing a set of steps in accordance with an exemplary method for conducting a Device Commissioning operation wherein a replacement field device is initially configured in an instrument shop.

Turning to FIG. 5, a sequence of steps are summarized for carrying out replacement of a FOUNDATION™ fieldbus device by initially setting up the replacement field device in an instrument shop (Device Commissioning) and thereafter physically installing the replacement field device in place of the old field device to complete the field device replacement procedure. These steps, in contrast to steps described herein below with reference to a Device Commissioning device replacement method (see, FIG. 7), are performed in-part in an instrument shop.

Initially, at step 500, the replacement field device is communicatively connected to the network (e.g., one hosting the device definition database and application database) in an "instrument shop" environment comprising well known fixtures and network cabling to facilitate bench configuration of the replacement field device.

Thereafter, the technician initiates executing an automated Device Commissioning procedure 501. By way of example, to invoke the Device Commissioning procedure 501, a user opens a configuration component interface (see, e.g., FIG. 6a) on a workstation or portable configuration tool. The interface contains a list of field devices in a process control network. The user selects an identified device from a displayed list of names corresponding to online field devices (filtered to present only devices coupled to a specified link/segment). In a particular example, a user selects a particular H1 fieldbus link to view a set of connected, online fieldbus devices. The user also selects a field device configuration definition (corresponding to the replaced field device) from the application database 109. The user thereafter invokes the Device Commissioning procedure characterized by the set of exemplary steps 501 by, for example, selecting a Device Commissioning action option from a set of action options and then initiating the Device Commissioning action by actuating a graphical user interface button that becomes active once all the aforementioned Device Commissioning configuration options have been designated.

In response at step 502 the Device Commissioning procedure commences, and an identification (ID) and network/communication address are set for the replacement field device to match the values from the device object in the database. In an exemplary case where the field device is a FOUNDATION™ fieldbus device, a PD_Tag (ID) and Node (network) Address are designated for the replacement field device. The node address corresponds to the physical address of the field device when it is later installed in place of a replaced device in the field (e.g., on a plant floor).

Continuing the Device Commissioning procedure 501, at step 504 the field device enters a state or mode that permits performing configuration actions. By way of example, FOUNDATION™ fieldbus devices contain individual function blocks that must be placed within special modes to allow configuration of the replacement field device, and such blocks enter these special modes during step 504.

At step 506 configuration information, corresponding to the device that is to be replaced, is retrieved from the application database 109 and used to configure parameters that govern the operation of program components executed within the replacement field device. The retrieved configuration information corresponds to parameter values/settings (see, e.g., FIG. 3) for the field device that is to be replaced by the replacement field device. In an exemplary embodiment wherein the field device is a FOUNDATION™ fieldbus device, the replacement device's transducer blocks and resource blocks are configured during step 506 based upon instance-specific values and settings associated with the replaced field device. After completing step 506, at step 508 the operational state of the field device is restored to the state within which it existed before executing step 504. In the case of a FOUNDATION™ fieldbus device, block modes are reset to an operational state. A final step 509 is performed to upload parameters from the device if that option was configured for the commissioning step. The bench configured field device is now ready for installation on an operational process control network/system. Step 509 completes the automated Device Commissioning procedure based upon a set of parameter values stored in a record (corresponding to the replaced field device) in the application database 109.

Prior to installing the replacement field device on the operational process control network/system, e.g., during step 510, the old field device (the one to be replaced) is taken offline. In an exemplary embodiment step 510 comprises issuing a command taking the old field device offline via a system management utility. Taking the old field device offline causes higher level control elements (e.g., a control processor or fieldbus module) to cease attempting to communicate with the old field device. Thereafter, at step 512 the old field device is physically disconnected from its field network link (e.g., H1 fieldbus segment/link). Physically disconnecting the old field device is by-passed when wireless communications are utilized by field devices to communicate with their respective fieldbus modules or other suitable higher level control elements (e.g., control processors). At step 514 the replacement field device, previously setup and partially configured in the instrument shop environment, is physically connected to a field network segment (if not using wireless communications), such as an H1 fieldbus link, as well as any plant component (e.g., a tank) with which the replacement field device operates.

Thereafter, at step 516 the replacement field device is brought online to facilitate communications between the replacement field device and other components of a distributed process control system. In an exemplary embodiment step 516 comprises invoking a command identifying the replacement field device to be brought online. In general, step 516 comprises performing operations sufficient to register the replacement field device's presence on the field network link to which it was physically connected during step 514. In a plug-and-play network environment, step 516 is fully automated. In other embodiments, user intervention is required to bring the replacement field device communicatively online.

With continued reference to FIG. 5, during step 518 device data (e.g., a field device serial number) that is unique to a specific instance of a particular field device type is uploaded from the replacement field device to the application database 109. This data is generally distinct from data stored within the application database 109 that guides execution of the automated configuration operations performed during steps 506. By way of example, and not limitation, during step 518 the user brings up a Comparison screen through which the user can determine the differences between the parameters in the field device and the parameters stored in the database. An example of such a screen/utility is described in Bump et al., U.S. patent application Ser. No. 11/403,228, filed on Apr. 11, 2006, entitled "UTILITY FOR COMPARING DEPLOYED AND ARCHIVED PARAMETER VALUE SETS WITHIN A FIELD DEVICE EDITOR" the contents of which are incorporated herein by reference in their entirety, including any references therein. The user then updates the application database 109 with values that are unique to the device instance. Such parameters include a unique manufacturer serial number assigned to the replacement field device. Other instance-specific information, such as the installer, date/time of installation, etc. is also potentially uploaded during the device data compare step 518.

Figure 6A:
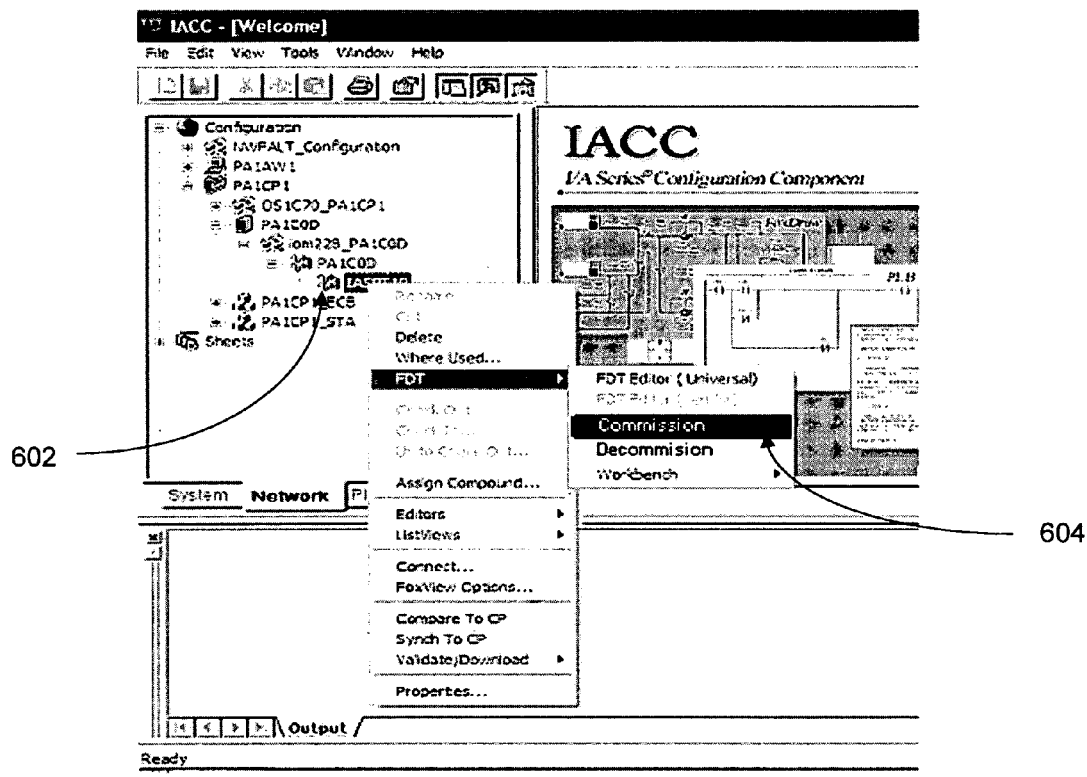
FIG. 6 is an exemplary user interface for selecting from an extensible set of operations involving replacement of a field device with another field device of a same type.
Figure 6B:
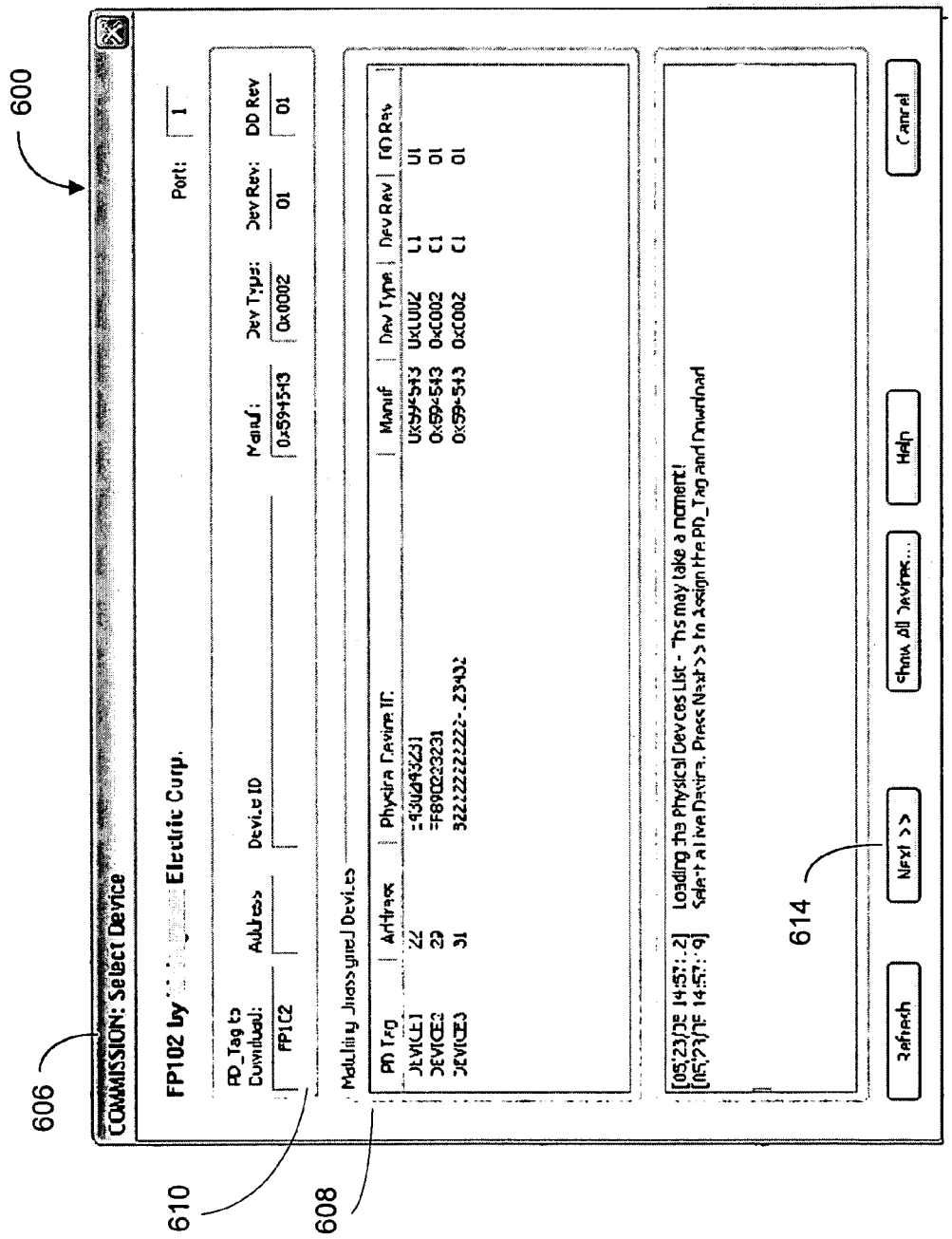

Turning to FIG. 6a, an exemplary configuration component graphical user interface is presented that facilitates invoking field device commissioning (see, e.g., FIG. 5, step 501) and uploading field device data to the application database 109 (see, e.g., step 509). In the illustrative user interface embodiment depicted in FIG. 6b, a maintenance graphical user interface, launched via the configuration component depicted in FIG. 6a, includes a title bar 600. A user selects a device from an Equipment Hierarchy tree 602 that corresponds to a device object instance (e.g., IASPT10) in the application database 109. In the illustrative case, a record is currently accessed that contains configuration parameters/values for a pressure transmitter assigned an identification text string "IASPT10". The transmitter identified as IASPT10 corresponds to a previously fully configured field device that has been (or soon will be) physically replaced on a process control field network by a replacement field device of the same type. By way of example and not limitation, the field device record identified in object 602 is obtained through a tree interface that filters a list of potential device records according to a selected port/H1 link in a Foundation Fieldbus industrial process control network. An action options list 604 of the exemplary user interface depicted in FIG. 6a enables a user to select from a set of automated operations relating to field device maintenance in a streamlined fashion. When a user selects the "Commission" option from the list 604, the user is presented with a new screen with the user-designated option listed in the upper left header 606 for the new screen. The field device instances listed within a device candidates live list field 608 represent potential recipients/sources of parameter values and/or invoked methods—depending upon the option selected from the action options list 604 previously assigned to the device identified in object 602. In the illustrative embodiment of the invention, it is up to the user to select a proper device from a set of all field devices having enabled communications on a particular segment of a process control network connected to a field bus module port, identified in fieldbus segment box 610. Users select a device from the Equipment Hierarchy tree 602 without selecting the Fieldbus Port that the device resides on (each FBM has 4 separate ports). The Port number is stored in the database and is illustrated on the Commissioning Dialog box 616. When a particular enabled field device is selected, its information line (e.g., DEVICE1) is highlighted to convey that it is the selected device. A user invokes the selected task (i.e., commissioning the selected device) via Next button 614 after selecting a device instance from the list of device candidates via the exemplary configuration component user interface.

Figure 7:
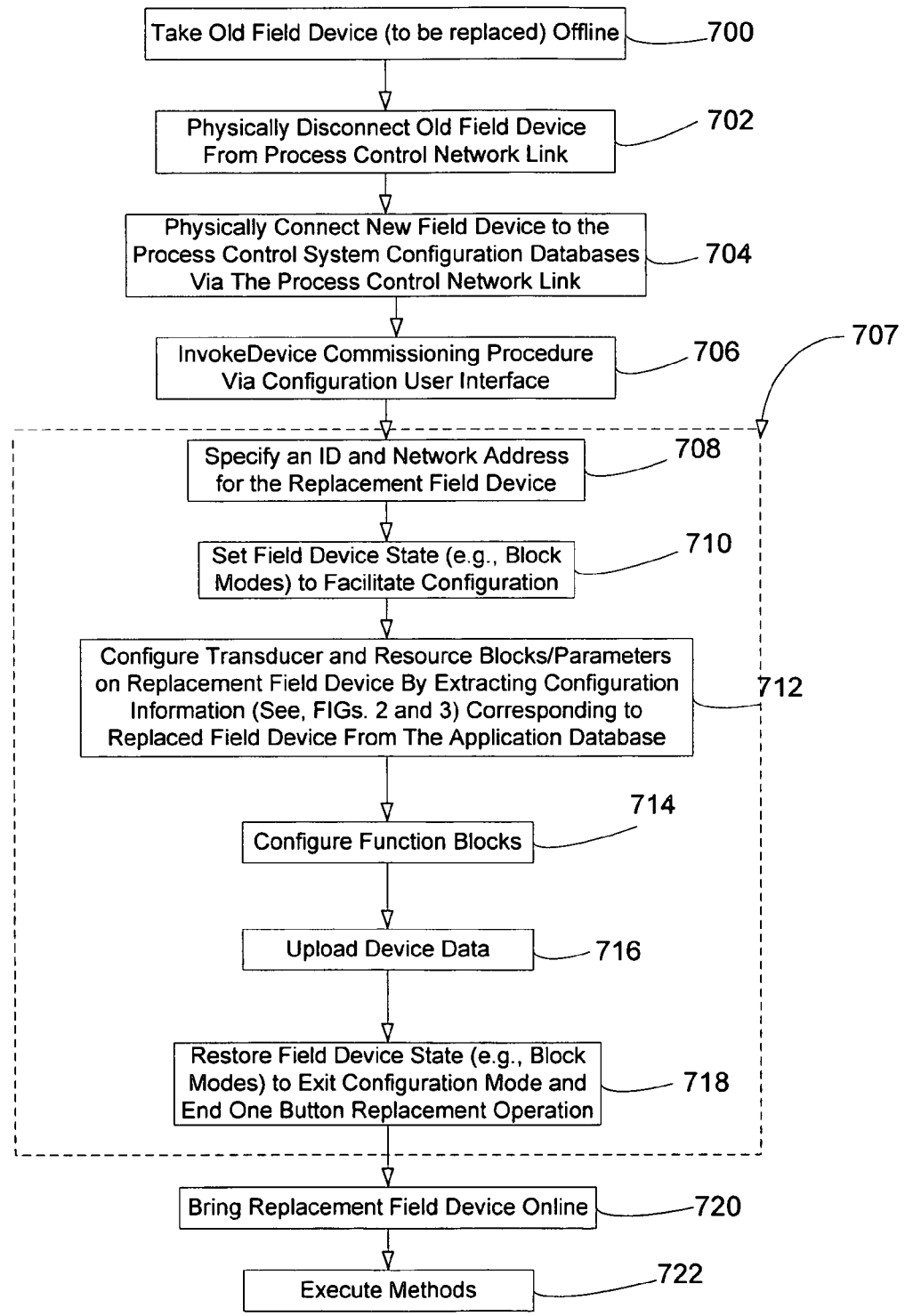
FIG. 7 is a flowchart summarizing a set of steps in accordance with an exemplary method for conducting a Device Commissioning operation wherein a replacement field device is configured in the field.

Turning to FIG. 7, an exemplary sequence of steps are summarized for directly replacing a field device on a plant floor (or other location in the field)—as opposed to performing initial setup in an instrument shop as described herein above with reference to FIG. 5. In the illustrative replacement method described below, a first field device is replaced by a second field device of the same type (having the same configurable parameters) using the "Device Commissioning" action option presented in the list of action options 604 described herein above with reference to FIG. 6a.

Initially, during step 700 the field device that is to be replaced is taken offline. In an exemplary embodiment step 700 comprises invoking a command to take the field device offline. Thereafter, at step 702 the old field device is physically disconnected from its field network link (e.g., H1 fieldbus segment/link) and plant equipment. Physically disconnecting the old field device from the network is not performed when wireless communications are utilized by field devices to communicate with their respective fieldbus modules or other suitable higher level control elements (e.g., control processors). Furthermore, embodiments of the invention contemplate automatically setting a field device to "offline" status in response to physically disconnecting the field device from a network link.

At step 704 the user physically connects a non-configured replacement field device on the field network link (if not using wireless communications) to which the old field device was disconnected during the previous step. The replacement field device is also connected to any plant component (e.g., a tank) with which the field device operates.

At step 706 the user, through the configuration component user interface depicted in FIG. 6a, initiates the Device Commissioning action operation (i.e., Commission) of the set of action options 604. In response the automated Device Commissioning procedure 707 commences at step 708 wherein an identification (ID) and network/communication address for the replacement field device are specified for the replacement field device. In the exemplary case where the field device is a FOUNDATION™ fieldbus device, a PD_Tag (ID) and Node (network) Address are designated for the replacement field device. These two values are utilized to reference the replacement field device on the field network during subsequent configuration and online runtime operations/communications.

Thereafter continuing the automated Device Commissioning action, at step 710 the replacement field device is placed into a state or mode that permits configuration of the field device. By way of example, in the case of a FOUNDATION™ fieldbus device having individual blocks that must be placed within special modes to allow configuration of a field device, the user/technician sets the blocks within such special modes. Thereafter, during step 712 configuration information previously stored within the application database 109 for the replaced field device is retrieved from the application database 109 and stored within appropriate configurable fields of the replacement field device that determine/configure the operation of the replacement field device. In general parameter values are configured at a device level during step 712 while the replacement field device remains offline. In an exemplary embodiment wherein the field device is a FOUNDATION™ fieldbus device, the replacement device's transducer blocks and resource blocks are configured during step 712.

During step 714, function blocks that require communication with other components of the process control network (e.g., control processors) are configured in accordance with the automated steps of the Device Commissioning action invoked at step 706. The function blocks are configured in accordance with values (see, e.g., FIG. 3) previously specified for the replaced field device and stored within the application database 109.

With continued reference to FIG. 7, during step 716 device data (e.g., a field device serial number) that is unique to a specific instance of a particular field device type is uploaded from the replacement field device to the application database 109. The uploaded data is generally distinct from data stored within the application database 109 that guides execution of the automated configuration operations performed during step 506. By way of example, and not limitation, during step 716 a unique manufacturer serial number assigned to the replacement field device is uploaded from the replacement field device to the application database 109. Other instance-specific information, such as the installer, date/time of installation, etc. is also potentially uploaded during the device data upload step 716. The Device Commissioning step automatically performs an "Upload Device Data" action if the Upload after Commissioning checkbox is set in FIG. 3.

At step 718, the operational states/modes of the field device's blocks are reset to the ones that existed before setting the configuration state of the replacement device at step 710. In the case of a FOUNDATION™ fieldbus device, block modes are reset. At this point, the replacement field device is completely operational and setup to match the configuration of the replaced field device.

After completing the device-level automated configuration of the replacement field device, at step 720 the replacement field device is brought online to facilitate communications between the replacement field device and other components of a distributed process control system. In general, step 720 comprises performing operations sufficient to register the replacement field device's presence on the field network link to which it is physically connected. In a particular exemplary embodiment, step 720 comprises invoking a command identifying the replacement field device.

During step 722 methods may be executed. An example of such method is the "Auto-start" method on a field device. One possible embodiment of method execution could be a user-configured method, or methods, that are automatically executed during device commissioning.

With continued reference to FIG. 7, the steps described for device replacement can be applied to the initial commissioning of a plant. In the initial commissioning there is no failed device to replace, and therefore steps 700 and 702 are not performed. Plant engineers connect all devices in the plant, or plant area to the system as a large scale step 704. When the plant or plant area is to be commissioned, the Device Commissioning action is performed on each device from a defined device instance in the application database. The commissioning action, starting with step 706 and continuing to the end, commissions the device to initiate plant operations. The use of Device Commissioning provides a fast and error free mechanism to bring up the large number of devices involved in initial plant startup.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software, stored on computer-readable media in the form of computer executable instructions, may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for installing a field device as a replacement for a previously installed field device of a same type, the method comprising the steps of:

specifying a device type commissioning definition including a set of device-type specific parameters for which parameter values are downloaded to render the replacement for the previously installed field device operational, wherein the device type commissioning definition includes a mode field for specifying, on an individual parameter basis, an operational mode for a device when writing a parameter value to support device replacement, and wherein the device type commissioning definition specifies a timing requirement for writing specific parameters on an individual parameter basis;

storing, in a database, a first set of instance-specific configuration parameter values for a first field device corresponding to the set of device-type specific parameters;

physically replacing the first field device by a second field device on a process control network, wherein the first field device and second field device are of the same type;

identifying for the second field device, via a user interface, a configuration data source identification corresponding to the first set of instance-specific configuration parameter values in the database; and invoking a configuration procedure for the second field device, connected to the process control network, wherein the configuration procedure comprises a sequence of automated operations carried out according to:

the device type commissioning definition; and
the first set of instance-specific configuration parameter values.

2. The method of claim 1 wherein the specifying step is carried out via a configuration graphical user interface.

3. The method of claim 2 wherein the configuration graphical user interface is presented in accordance with a device-type specific editor definition.

4. The method of claim 3 wherein the device-type specific editor definition is a component of a device object instance stored in the application database corresponding to the first field device.

5. The method of claim 1 wherein the first set of instance-specific configuration parameter values is stored as a device object instance.

6. The method of claim 5 wherein the object instance is created from a device template corresponding to a specific device type.

7. The method of claim 6 wherein the device template is stored in a device definition database that is separate and distinct from an application database that stores the object instance.

8. The method of claim 1 wherein the configuration step is performed while the second device is connected at an intended operating location in a plant.

9. A process control system configuration component facility that facilitates streamlined installation of a second field device as a physical replacement for a previously installed first field device of a same type in a process control system, the facility comprising:

a processor;

a memory device communicatively connected to the processor;

a database, stored on the memory device, for storing instance specific information associated with a first device, the instance-specific information comprising:
   a device type commissioning definition including a set of device-type specific parameters for which parameter values are downloaded to render the physical replacement for the previously installed first field device-type specific parameters, wherein the device type commissioning definition includes a mode field for specifying, on an individual parameter basis, an operational mode for a device when writing a parameter value to support device replacement, and wherein the commissioning definition specifies a timing requirement for writing specific parameters on an individual parameter basis, and
   a first set of instance-specific configuration parameter values for the first field device corresponding to the set of device-type specific parameters;
a configuration component comprising:
   a user interface for identifying, for the second field device, a configuration data source identification corresponding to the first set of instance-specific configuration parameter values in the database; and
   a user-initiated configuration procedure for the second field device, connected to the process control network, wherein the configuration procedure comprises a sequence of automated operations carried out according to:
      the device type commissioning definition, and
      using the first set of instance-specific configuration parameter values.

10. The facility of claim 9 further comprising a configuration graphical user interface for specifying the device type commissioning definition.

11. The facility of claim 10 wherein the configuration graphical user interface is presented in accordance with a device-type specific editor definition.

12. The facility of claim 11 wherein the device-type specific editor definition is a component of a device object instance stored in the application database corresponding to the first field device.

13. The facility of claim 9 wherein the first set of instance-specific configuration parameter values is stored as a device object instance.

14. The facility of claim 13 wherein the object instance is created from a device template corresponding to a specific device type.

15. The facility of claim 14 wherein the device template is stored in a device definition database that is separate and distinct from an application database that stores the object instance.

16. A non-transient computer readable medium including computer executable instructions for facilitating installing a field device as a replacement for a previously installed field device of a same type, the computer executable instructions facilitating performing the steps of:
   specifying a device type commissioning definition including a set of device-type specific parameters for which parameter values are downloaded to render the replacement for previously installed field device operational, wherein the device type commissioning definition includes a mode field for specifying, on an individual parameter basis, an operational mode for a device when writing a parameter value to support device replacement, and wherein the device type commissioning definition specifies a timing requirement for writing specific parameters on an individual parameter basis;
   storing, in a database, a first set of instance-specific configuration parameter values for a first field device corresponding to the set of device-type specific parameters;
   physically replacing the first field device by a second field device on a process control network, wherein the first field device and second field device are of the same type;
   identifying for the second field device, via a user interface, a configuration data source identification corresponding to the first set of instance-specific configuration parameter values in the database; and
   invoking a configuration procedure for the second field device, connected to the process control network, wherein the configuration procedure comprises a sequence of automated operations carried out according to:
      the device type commissioning definition, and
      using the first set of instance-specific configuration parameter values.

17. A method for installing a field device as a replacement for previously installed field device of a same type, the method comprising steps of:
   specifying a device type commissioning definition including a set of device-type specific parameters for which parameter values are downloaded to render the replacement for the previously installed field device operational;
   storing, in a database, a first set of instance-specific configuration parameter values for a first filed device corresponding to the set of device-type specific parameters;
   physically replacing the first field device by a second field device on a process control network, wherein the first field device and second field device are of the same type;
   identifying for the second field device, via a user interface, a configuration data source identification corresponding to the first set of instance-specific configuration parameter values in the database;
   invoking a configuration procedure for the second field device, connected to the process control network, wherein the configuration procedure comprises a sequence of automated operations carried out according to:
      the device type commissioning definition, and
      the first set of instance-specific configuration parameter values; and
   wherein the commissioning device definition includes a mode field, the mode field specifying, on an individual parameter basis, a set of rules defining when to update a parameter value to support the device replacement, and wherein the device type commissioning definition specifies a timing requirement for writing specific parameters on an individual parameter basis.

* * * * *